United States Patent [19]
Johnson

[11] 3,836,113
[45] Sept. 17, 1974

[54] AXIAL FLOW VALVE

[75] Inventor: Dwight N. Johnson, Anaheim, Calif.

[73] Assignee: The Singer Company, New York, N.Y.

[22] Filed: Nov. 1, 1971

[21] Appl. No.: 194,188

Related U.S. Application Data

[63] Continuation of Ser. No. 867,195, Oct. 17, 1969, abandoned.

[52] U.S. Cl.................................. 251/5, 251/61.1
[51] Int. Cl............................................... F16k 7/07
[58] Field of Search............... 137/515, 515.7, 525; 251/5, 61.1

[56] References Cited
UNITED STATES PATENTS

| | | | |
|---|---|---|---|
| 994,167 | 6/1911 | Koppitz | 137/492 |
| 3,143,124 | 8/1964 | Todd | 251/5 X |
| 3,145,967 | 8/1964 | Gardner | 251/5 |
| 3,371,677 | 3/1968 | Connolly | 251/5 X |
| 3,467,131 | 9/1969 | Ratelband | 251/5 X |

FOREIGN PATENTS OR APPLICATIONS

| | | | |
|---|---|---|---|
| 81,273 | 11/1950 | Czechoslovakia | 251/61.1 |
| 727,366 | 3/1955 | Great Britain | 251/61.1 |
| 986,047 | 3/1949 | France | 251/5 |

*Primary Examiner*—William R. Cline
*Assistant Examiner*—Richard Gerard
*Attorney, Agent, or Firm*—Lyon & Lyon

[57] ABSTRACT

There is disclosed herein a throttling valve of the axial flow type for controlling fluid flow. The valve includes an expandable sleeve of resilient material having a toroidal configuration and positioned within a housing on a cage member. When the sleeve is in a rest position there is no fluid flow, but the sleeve can expand as a result of differential pressure acting thereon to allow flow in varying degrees between the sleeve and cage.

20 Claims, 7 Drawing Figures

INVENTOR
DWIGHT N. JOHNSON
BY
Lyon & Lyon
ATTORNEYS

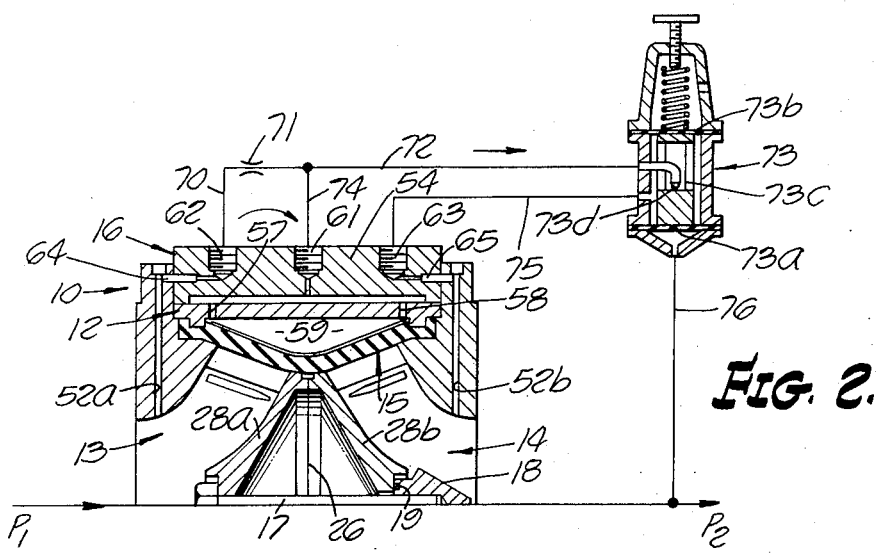
FIG. 2.
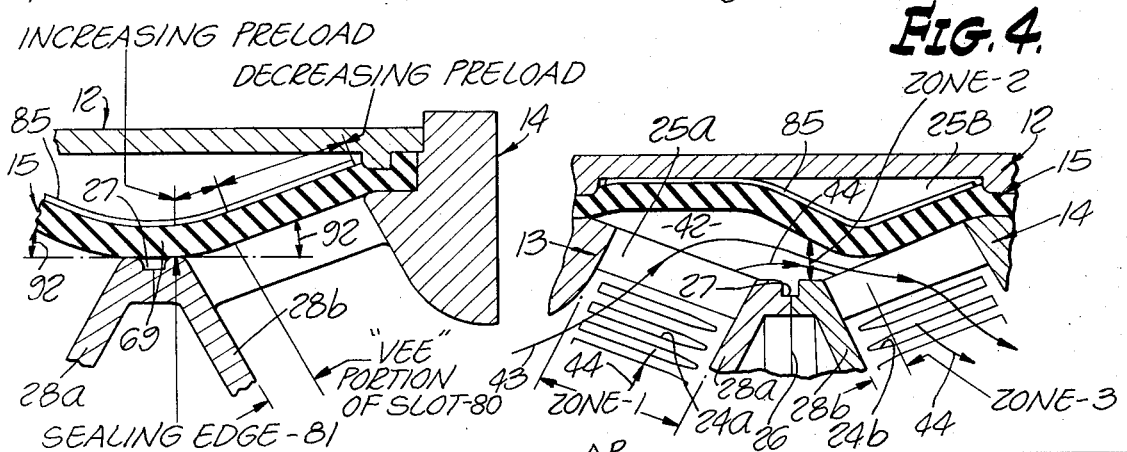
FIG. 3.
FIG. 4.
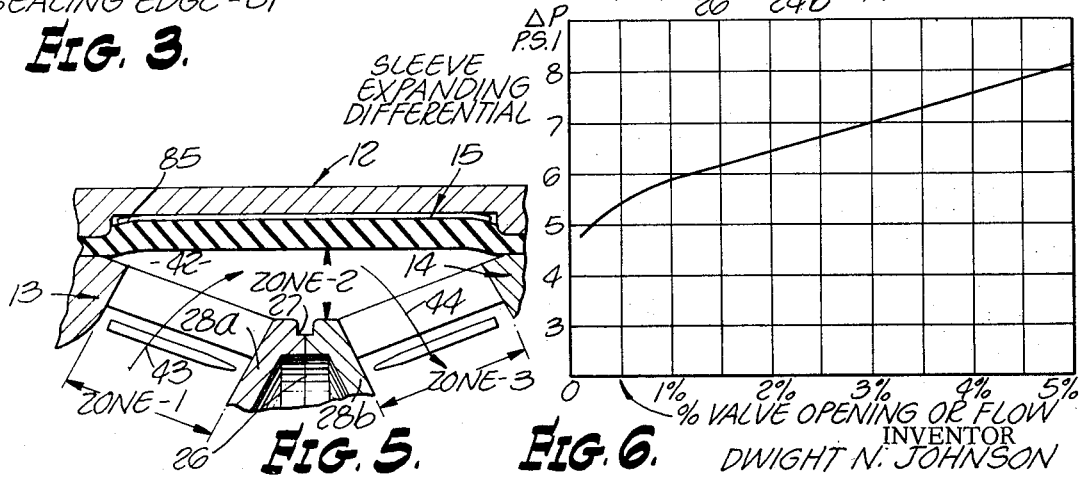
FIG. 5.
FIG. 6.
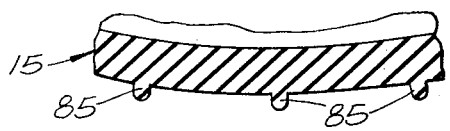
FIG. 7.
INVENTOR
DWIGHT N. JOHNSON
BY Lyon Lyon
ATTORNEYS

AXIAL FLOW VALVE

This is a continuation of application Ser. No. 867,195, filed Oct. 17, 1969 and since abandoned.

This invention relates to a throttling valve and more particularly to an expandable sleeve axial flow valve.

Conventional fluid valves employ an actuating element usually in the form of a diaphragm which responds to pressure differentials for controlling some type of throttle mechanism, usually in the form of a valve member and orifice. Valves of the axial flow type have been devised and generally include a cage member surrounded by a cylindrical resilient sleeve. More particularly, a circular slotted cage with a barrier in the center thereof is encircled by an expansible rubber sleeve. The annular chamber between an outer body or housing allows the sleeve to expand, permitting fluid flow through the slotted cage and past the center barrier. Valve closure is obtained by introducing pressure equal to the input pressure into the annular chamber at the outer periphery of the sleeve. This action maintains the sleeve in contact with the cage thereby preventing fluid flow through the valve. An arrangement of this general nature is illustrated in U.S. Pat. No. 2,622,619.

Prior expansible sleeve valves have been characterized by several drawbacks. Stability thereof generally is poor at low fluid flows through the valve. The fluid stream usually impinges substantially upon the sleeve and deflects the fluid stream thereby subjecting the sleeve to erosion. The usual sleeve requires special vacuum expanding equipment for removal of the sleeve from the cage. Other difficulties known to those in the art are encountered in the assembly, operation and use of such prior valves.

Accordingly, it is a principal object of this invention to provide an improved valve of the axial flow, expansible sleeve, type.

It is an object of this invention to provide an axial flow valve employing an expansible sleeve of novel configuration.

It is a further object of this invention to provide an axial flow valve employing an expansible sleeve and which is characterized by improved operation.

These and other objects and features of the present invention will become better understood through a consideration of the following description taken in conjunction with the drawings in which:

FIG. 2 is a fragmentary diagramatic cross-sectional view and flow diagram of the present valve as utilized for pressure control;

FIGS. 3 through 5 are fragmentary diagramatic cross-sectional views illustrating operational characteristics of the sleeve of the present valve, and respectively show the valve closed, throttling and open;

FIG. 6 is a graph illustrating operational characteristics of the present valve; and FIG. 7 is a fragmentary cross-sectional view of the sleeve.

Figure 1:
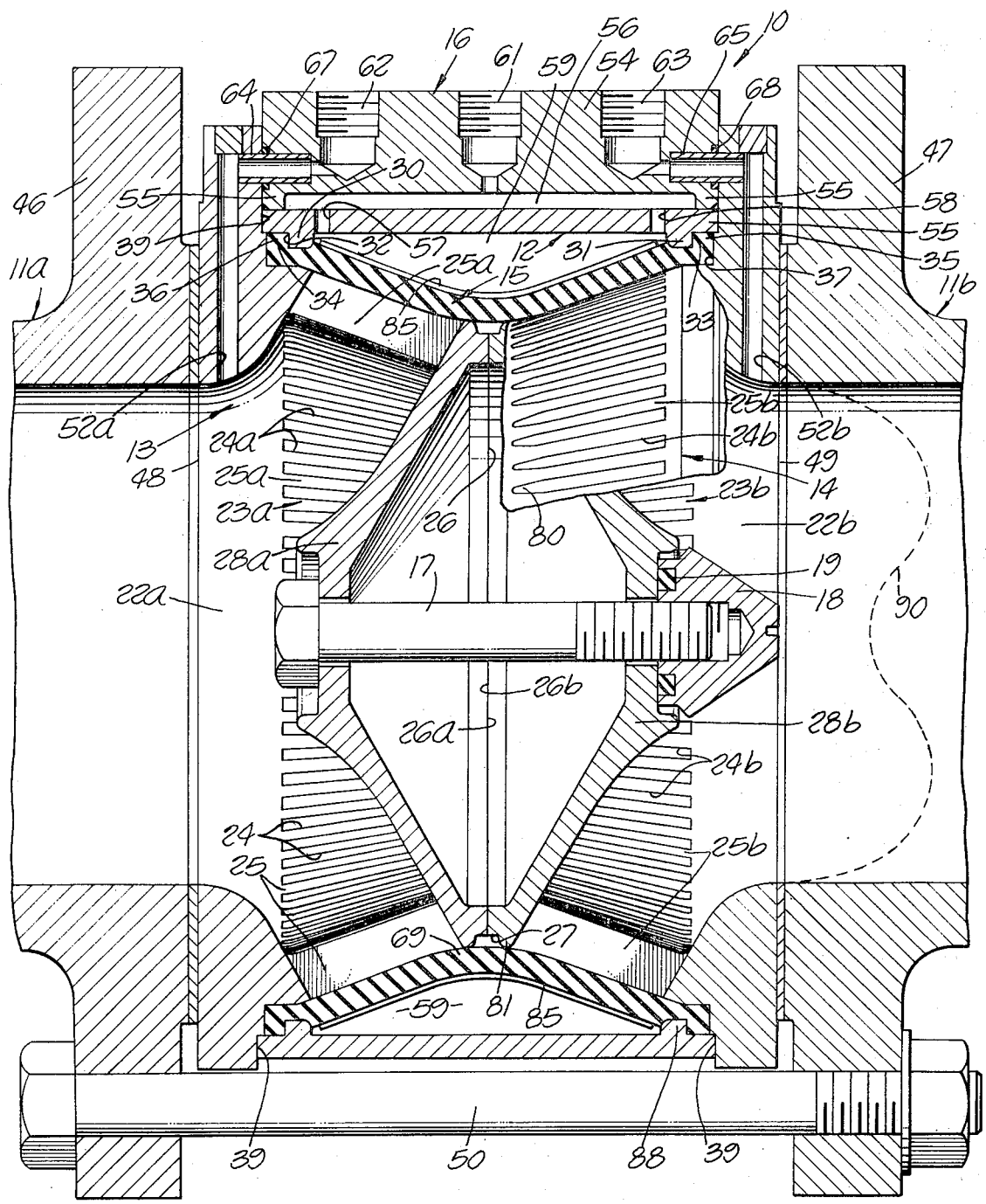
FIG. 1 is a cross-sectional elevational view of a valve constructed in accordance with the teachings of the present invention.

Turning now to the drawings, FIG. 1 illustrates the valve 10 interposed within a fluid line 11a–11b. The valve 10 includes an outer cylindrical body 12, a pair of substantially identical slotted cages 13 and 14, and a resilient expansible sleeve 15 positioned around the cages 13 and 14. A manifold 16 is welded to the outer periphery of the body 12 for purposes which will be explained in greater detail subsequently. The cages 13 and 14 are secured together by means of a bolt 17 and fairing nut 18. A downstream seal is provided by an O-ring 19.

Considering the construction of the valve in more detail, each of the cages 13 and 14 is substantially identical and hence only one will be described in detail. The cages include an annular throat portion 22, which is an inlet throat 22a in the case of the cage 13 and an outlet 22b in the case of the cage 14. The throat flares outwardly to a truncated cone portion 23 which is in the form of a plurality of elongated slots 24 and ribs 25. The slots extend entirely through the wall of the truncated cone portion 23 of the cage. The portion 23 terminates in a face 26, and faces 26a and 26b of the cages 13 and 14 are abutted as shown in FIG. 1. The cages are undercut at the edges of the faces 26 thereby forming an annular groove 27 when the cages are abutted as shown. This construction compensates for variations in manufacture which results in slight eccentricities. Extending backwardly from the face 26 is a solid barrier portion 28 in the form of a cone through which the bolt 17 extends to secure the cages 13 and 14 together to effectively form one cage unit. Each cage thus is similar to a bowl having a raised center and a slotted wall.

The body 12 includes internal edge rims 30 and 31 forming respective shoulders 32 and 33. The ends of the sleeve 15 include flanges 34 and 35 which are sandwiched between the shoulders 32 and 33 and respective L-shaped surfaces 36 and 37 at the periphery of the annular throat portions of the respective cages 13 and 14. The cages include a flange 39 which abut the outer circular faces of the body 12 as seen in FIG. 1. In this manner, the cages 13 and 14, body 12 and sleeve 15 are secured together as a rigid unit by the bolt 17 and nut 18. It will be apparent that fluid flow into the inlet throat 22a of the cage 13 cannot flow to the outlet throat 22b with the sleeve 15 in the position shown in FIGS. 1–3 because the inner surface of the sleeve 15 seals all of the grooves 24. Turning briefly for the moment to FIGS. 4 and 5, which will be explained in greater detail subsequently, it can be seen that as the sleeve 15 expands radially outward because of a higher pressure on the inside thereof than on the periphery thereof, fluid can flow from the inlet throat 22a through grooves 24a past the cage ribs 25a and through the annular space or cavity 42 formed between the inner surface of the sleeve and outside of the cages as the sleeve expands. the fluid then flows through the grooves 24b and past the ribs 25b to the outlet throat 22b and thus into the downstream fluid line 11b as indicated by arrows 43 and 44.

The valve 10 is sandwiched between pipe flanges 46 and 47 of the respective fluid lines 11a and 11b. Seals are provided by gaskets 48 and 49. A plurality of bolts, such as a bolt 50, extend through the flanges 46 and 47 at several locations around the periphery of the valve to secure together the flanges and the valve. This arrangement of the valve between the flanges produces only compressive stress on the valve.

The cages 13 and 14 include passages 52a and 52b, respectively, which communicate between the respective throat sections and the manifold 16. The manifold 16 is in the form of a block 54 having a skirt 55 around the bottom thereof. The skirt mates with the outer surface of the body 12 and is welded all around the skirt to secure the manifold to the body and to provide a sealed chamber 56. The chamber 56 communicates through passages 57 and 58 with an annular control chamber 59 defined by the outer periphery of the sleeve 15 and inner wall of the body 12. The manifold 16 includes a port 61 which communicates with the chamber 56, and ports 62 and 63 which respectively communicate through hollow roll pins 64 and 65 with the passages 52a and 52b, respectively. Seals are provided about the roll pins 64 and 65 by respective O-rings 67 and 68. The roll pins serve to align the passages 52a and 52b with the manifold 16 and to provide the noted communication with the respective ports 62 and 63.

From the foregoing, it will be apparent that the port 62 communicates with the inlet throat 22a of the valve through the passage 52a and roll pin 64. The port 63 communicates with the outlet throat 22b through the passageway 52b and the roll pin 65. It should be noted that the construction of the present valve is symmetrical and either end thereof may be used as the upstream end.

The sleeve 15 may be molded of a suitable resilient material such as rubber, and is molded to a diameter smaller than the periphery of the cages 13 and 14 which is surrounds. Molded in this manner, the sleeve is preloaded and is normally closed, and a sleeve expanding differential pressure thus is necessary to open the valve. External control of the sleeve expanding differential causes the valve to regulate pressure, or flow, as the particular application thereof dictates. The sleeve is essentially toroidal and flares outwardly from the central, smaller diameter, portion 69 toward both ends thereof. The thickness of the sleeve may vary from the center outward, but the sleeve preferably is of uniform thickness to prevent localized distortion thereof and to allow the valve to operate over a wide temperature range.

A typical external control circuit for pressure regulation is illustrated in FIG. 2. Here, the port 62 is connected through a line 70, a restrictor 71 and a line 72 to the orifice of a conventional pilot regulator 73. This pilot regulator may be a type "Z-SC," Model 100 regulator, manufactured and sold by the American Meter Company of Fullerton, California. The port 61 is coupled through a line 74 to the line 72, and the port 63 is coupled through a line 75 to the interior chamber of the regulator 73. As is well known, the regulator 73 includes diaphragms 73a and 73b coupled by a yoke 73c. Pressure from the line 75 is applied between the diaphragms, pressure from the line 72 is applied at an orifice 73d, and output pressure $P_2$ is applied to the underside of the diaphragm 73a by a line 76.

In operation, upstream pressure $P_1$ flows through the passageway 52a to the port 62, and through the restrictor 71 and line 74 back to the port 61 and chamber 59. The pressure in the line 72 is applied to the inlet of the pilot regulator 73. Downstream pressure $P_2$ is supplied by the line 76 to the pilot regulator. If the downstream pressure $P_2$ satisfies the set point of the pilot regulator 73, the pressure in the annular chamber 59 will equal the upstream pressure $P_1$ and the valve will be closed with the sleeve 15 positioned on the cage unit 13–14 as seen in FIGS. 1 through 3. As the downstream pressure $P_2$ lowers, the pilot regulator 73 will progressively open the orifice 73d and cause a pressure drop across the restrictor 71 proportional to the degree of pilot opening. It will be apparent that reduced pressure in line 72 causes a reduction in pressure in the control chamber 59. The sleeve expanding differential pressure across the sleeve 15 is therefore proportional to the reduction in downstream pressure from the set point of the pilot regulator 73.

It is well known that a proportional relationship between downstream pressure change and degree of valve opening contributes greatly to regulator stability. This proportional relationship is known as "droop" or "offset" when seen on a regulator capacity curve. Regulator stability becomes difficult to achieve at low flows when the valve opening is comparatively small. The graph of FIG. 6 shows the relationship of valve opening to sleeve expanding differential afforded by the present valve. It should be noted that the delta pressure change required for a given increment of valve opening is greater at valve openings below 1 percent. The resultant "droop" or "offset" would be most pronounced in the first increment of flow, which is the region where regulator instability is most likely to occur. The curve in FIG. 6 is accomplished in the present valve by valve differential pressure loading the sleeve against the "vee" portion 80 of the slots 24a–24b (note FIG. 3). This portion is a region of increasing preload, and the differential pressure across the sleeve makes it increasingly more difficult to lift the sleeve off the cage as the slots increase in width. The resultant valve action can be likened to peeling a newspaper off the grillwork of a sink drain. The section of the sleeve upstream of the sealing edge 81 serves to pull the small diameter portion 69 (FIG. 3) of the sleeve away from the sealing edge at differentials below that required to expand the small diameter sleeve portion as seen in FIG. 4. The slight increase in sleeve preload resulting from the "vee" portion 80 of the slots provides the "peeling off" valve action noted above. A gradual transition in the valve action occurs with increased valve opening. The sleeve expanding differential at the smallest diameter portion 69 of the sleeve 15 becomes the dominant factor in the degree of valve opening as the upstream section of the sleeve expands against the interior wall of the body 12. For a given differential, the smaller diameter portion 69 of the sleeve expands to provide an annular flow area 42. The decay in sleeve expanding differential as the gas flows from the above annular flow area into the cage determines the slope and contact point of the downstream portion of the sleeve. Referring to FIG. 4, zone 2 is the dominant annular flow area and zone 3 is the resultant flow area.

The final transition in valve action starts when the small diameter portion 69 of the sleeve expands to the point of contacting the inside surface of the body 12. At this point of sleeve expansion, the sleeve still slopes conically relative to the cage, since pressure decay still occurs as the gas flow feeds into the downstream slots 24b. A substantial sleeve expanding differential relative to inlet pressure needs to be generated to fully expand the sleeve 15 to the position shown in FIG. 5, because pressure drops occur across both zone 1 and zone 2 as seen in FIG. 5. The passage 52b is an aspirator passage which becomes active at higher flows and thus provides an artificially low downstream pressure for the purpose of achieving full sleeve expansion with low differential pressure across the valve.

A plurality of ribs 85 as seen in FIGS. 1 and 7 are provided on the periphery of the sleeve 15. As the sleeve 15 expands, the outer edges (the edges near the flanges 34 and 35) contact the interior surface of the body 12 first because of the greater diameter of the sleeve at the edges than at the middle of the sleeve. As these edges of the sleeve expand, the ribs 85 provide an escape route for fluid within the annular control chamber 59 so that this fluid can still escape through the passages 57 and 58 to allow the middle portion of the sleeve to expand, ultimately to the position shown in FIG. 5. An exemplary regulator has a length of approximately 4½ inches and a body diameter of approximately 6⅞ inches. The sleeve has an outer diameter at 88 of approximately 6⅝ inches and an outer diamter at the central portion 69 thereof of slightly under 5 inches, and an upstream-to-downstream length of approximately 3½ inches. The ribs are spaced approximately one-half inch apart on this sleeve, and the thickness of this sleeve is two hundred thousandths inch thick. The angle 92 (FIG. 3) of the cages may be approximately 20°, and the similar angle of the sleeve is slightly greater, such as 30°. The edge rims 30 and 31 of the body 12 serve to introduce a predetermined rate of sleeve expansion to aid in eliminating outward popping of the sleeve. These rims thus eliminate excess flexing and premature failure of the sleeve. The slots 24a–24b are tapered at the end 80. They taper from almost a point at 80 to essentially parallel sides. The tapered slot construction allows a more compact device with the wider end of the slots giving a greater flow area; otherwise, the slots, and thus the cages, would need to be longer to provide sufficient flow area. The thickness of the ribs 25 and the width of the slots 24 are approximately the same.

The particular truncated cone configuration of the cage 13 and 14, and particularly the outlet cage 14 provides an improved fluid flow pattern indicated by dotted line 90 in FIG. 1 into the downstream pipe 11b. The velocity profile 90 at the entrance of the downstream pipe 11b closely approximates the final velocity profile further downstream in the pipe. This velocity profile matching is achieved with a minimum amount of impingement or deflection of the gas stream, and the matching or minimum gas impingement, contribute both to high pressure recovery and low noise, and also to less pipe abrasion.

During the first increment of valve opening in conventional expansible sleeve valves, throttling action is initiated with an area, similar to that identified as zone 2 in FIG. 5, being the dominant, or controlling factor in valve opening. This action results in poor stability at low flows, and is not the case with the present invention as has been explained above.

The cone shaped cage and the toroidal sleeve provide a flow path configuration by which the sleeve does not fully or significantly deflect gas flow when the valve is open, as contrasted with prior devices in which the sleeve expands to a configuration which causes a large amount of flow to be deflected by the sleeve resulting in errosion of the sleeve. Prior substantially cylindrical sleeves, which are molded to a diameter smaller than a cylindrical cage, require special vacuum expanding equipment for removal of the sleeve from the cage; whereas, the two piece cage construction of the present valve enable ready disassembly and reassembly by one person using conventional tools. The present valve is symmetrical except for the fairing nut 18, and can throttle flow in either direction. The resulting advantages include double the wear life, use of common parts and bi-directional control of flow.

Additionally, the toroidal configuration of the sleeve 15 permits the sleeve material to contract longitudinally while being expanded circumferentially. With a cylindrical sleeve the same stretches essentially like a barrel. The dimensional advantages of the present sleeve closely follow the natural behavior of a stretched cylindrical rubber part and thus includes lower stress levels for a given annular opening 44. Low stress levels in the sleeve provide for longer sleeve life and more positive valve closure.

The relatively small size and light weight of the present valve permits economical use of close tolerances investment castings for the cages 13 and 14. The improved detail available with the investment casting process permits the design of narrow slots 24 with zero draft which in turn permits the use of a relatively thin sleeve 15. The investment casting process also allows the cages 13 and 14 to be made from a large variety of materials.

The present embodiment of this invention is to be considered in all respects as illustrative and not restrictive.

What is claimed is:

1. A valve for regulating the flow of fluid therethrough comprising
a housing, said housing having an opening through the periphery thereof,
cage means through which fluid may flow, mounted in said housing, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of openings therein for enabling fluid flow from said inlet through openings in said wall to the exterior of said cage means and from the exterior of said cage means through openings in said wall to said outlet, and said baffle extending into said outlet and forming a conical fairing to aid in fluid outlet velocity profile matching, flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall, manifold means having a plurality of ports, a first of said ports providing external communication with said opening through the periphery of said housing, and said cage means including a passageway at the outlet of said cage means communicating with another port of said manifold means.

2. A valve for regulating the flow of fluid therethrough comprising a housing, said housing having an opening through the periphery thereof, cage means through which fluid may flow, mounted in said housing, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of openings therein for enabling fluid flow from said inlet through openings in said wall to the exterior of said cage means and from the exterior of said cage means through openings in said wall to said outlet, and said baffle extending into said outlet and forming a conical fairing to aid in fluid outlet velocity profile matching, flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall, manifold means having a plurality of ports, a first of said ports providing external communication with said opening through the periphery of said housing, and said first and second wall portions of said cage means including passageways therethrough respectively communicating with said inlet and said outlet, said passageways communicating with second and third ports, respectively, of said manifold means.

3. A valve for regulating the flow of fluid therethrough comprising a housing, said housing having an opening through the periphery thereof, manifold means having a port communicating with said opening in said housing, cage means mounted in said housing through which fluid may flow, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of elongated openings therein for enabling fluid to flow through said wall, and said elongated openings in both portions having converging ends at the regions thereof near said baffle, said cage means comprising a pair of substantially identical cages, each of said cages having a throat and baffle member with a respective wall portion extending between the throat and baffle member, said baffle members of said cages comprising said baffle of said cage means, there being a groove about the periphery of each of said cages at the baffle member thereof, said grooves defining an annular groove about the intermediate portion of said cage means when said cages are in an abutting relationship, and flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall.

4. A valve for regulating the flow of fluid therethrough comprising a housing, said housing having an opening through the periphery thereof, cage means through which fluid may flow, mounted in said housing, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of openings therein for enabling fluid flow from said inlet through openings in said wall to the exterior of said cage means and from the exterior of said cage means through openings in said wall to said outlet, and said baffle extending into said outlet and forming a conical fairing to aid in fluid outlet velocity profile matching.

said cage means comprising first and second similar cages, each of said respective first and second wall portions extend from the respective inlet and outlet to a baffle member, the baffle members of said cages defining said baffle of said cage means, and fastening means for engaging the baffle member of said cages for securing together said cages, the baffle member of the second of said cages being substantially conical and said fastening means including a substantially conical fairing member engaging the outlet end of the baffle member of said second cage for aiding in said fluid outlet velocity profile matching, and flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall.

5. A valve for regulating the flow of fluid therethrough comprising a housing, said housing having an opening through the periphery thereof, cage means through which fluid may flow, mounted in said housing, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of openings therein for enabling fluid flow from said inlet through openings in said wall to the exterior of said cage means and from the exterior of said cage means through openings in said wall to said outlet, and said baffle extending into said outlet and forming a conical fairing to aid in fluid outlet velocity profile matching, said cage means comprising a pair of substantially identical cages, each of said cages having a throat and baffle member with a respective wall portion extending between the throat and baffle member, said baffle members of said cages comprising said baffle of said cage means, there being a groove about the periphery of said cages at the baffle member thereof, said grooves of the cages defining an annular groove about the intermediate portion of said cage means when said baffle member of said cages are in an abutting relationship, and flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall.

6. A valve for regulating the flow of fluid therethrough and adapted to be mounted between pipe flanges and the like comprising valve body means adapted to be coupled with pipe flanges and the like, said body means comprising housing means and cage means, with said cage means including an inlet and an outlet defining ends having faces adapted to be coupled with pipe flanges and the like and having openings therethrough between said ends, said housing means having an opening through the periphery thereof, and said cage means including a passageway therethrough communicating with the outlet end thereof, flexible preloaded sleeve means mounted between said housing means and said cage means, said sleeve means and an inner wall of said housing means defining a control chamber, and said sleeve means being normally in contact with at least a portion of said cage means for normally sealing said openings therethrough, and manifold means coupled with said housing means and having a plurality of ports, a first of said ports providing external communication with said opening through the periphery of said housing means, and another port communicating with the outlet of said cage means through said passageway in the outlet end of said cage means.

7. A valve for regulating the flow of fluid therethrough comprising a housing, said housing having an opening through the periphery thereof, cage means through which fluid may flow, mounted in said housing, said cage means having a wall with first and second portions separated by a baffle, the first portion converging in the form of a truncated cone from an inlet toward said baffle and the second portion diverging in the form of a truncated cone from said baffle to an outlet, each of said portions having a plurality of openings therein for enabling fluid flow from said inlet through openings in said wall to the exterior of said cage means and from the exterior of said cage means through openings in said wall to said outlet, and said baffle extending into said outlet and forming a fairing to aid in fluid outlet velocity profile matching, and flexible sleeve means mounted over the outer periphery of said wall, said flexible sleeve means having a configuration substantially the same as the outer periphery of said wall and being normally in contact with the periphery of the wall for sealing said openings through said wall, said opening in said housing communicating with a control chamber defined by the outer periphery of said sleeve means and the inner wall of said housing for enabling a differential pressure to be established across at least a portion of said sleeve means for expanding said sleeve means away from said openings through said wall, and said sleeve means having a plurality of longitudinal protrusions on the periphery thereof substantially parallel to the axis of the sleeve means for preventing firm peripheral contact of said sleeve means with the inner surface of said housing.

8. A valve for regulating the flow of fluid therethrough comprising, a flexible sleeve means, a pair of hollow cage means extending into the sleeve means from opposite ends thereof interconnected to each other for entrapping and axially confining the sleeve means therebetween, each of the cage means having a plurality of transverse flow passages therethrough, the cage means having a central barrier to prevent direct axial flow therethrough, the flexible sleeve means being preloaded in contact with the cage means and in sealing engagement about the transverse flow passages of the cage means, and means forming a control chamber about the periphery of the flexible sleeve means to control the movement of the flexible sleeve means in permitting flow through the valve.

9. A valve as in claim 8 wherein
said means forming a control chamber about the periphery of the flexible sleeve means comprises rigid sleeve means disposed about said flexible sleeve means.

10. A valve as in claim 8 wherein
the periphery of each cage means is relatively smooth except for a groove about the periphery thereof at said central barrier which defines an annular groove about the intermediate portion of the cage means at the central barrier.

11. A valve as in claim 8 wherein
each cage means is substantially identical and each has a substantially frusto-conical shape.

12. A valve for regulating the flow of fluid therethrough comprising
a flexible sleeve means,
a pair of hollow cage means extending into the sleeve means from opposite ends thereof interconnected to each other for entrapping the sleeve means therebetween,
each of said cage means having a plurality of narrow ribs defining a plurality of narrow elongated slots forming transverse flow passages therethrough,
the cage means having a central barrier to prevent direct axial flow therethrough, and said elongated slots having converging ends near said central barrier,
the flexible sleeve means being preloaded in contact with the cage means and in sealing engagement about the transverse flow passages of the cage means, and
means forming a control chamber about the periphery of the flexible sleeve means to control the movement of the flexible sleeve means in permitting flow through the valve.

13. A valve for regulating the flow of fluid therethrough comprising
a flexible sleeve means,
a pair of substantially identical hollow cage means each having a substantially frusto-conical shape, said cage means extending into the sleeve means from opposite ends thereof interconnected to each other for trapping the sleeve means therebetween,
each of said cage means having a plurality of narrow ribs defining a plurality of narrow elongated slots forming transverse flow passages therethrough,
the cage means having a central barrier to prevent direct axial flow therethrough, and said elongated slots having converging ends near said central barrier,
the flexible sleeve means being preloaded in contact with the cage means in sealing engagement about the transverse flow passages of the cage means, and
rigid sleeve means forming a control chamber about the periphery of the flexible sleeve means to control the movement of the flexible sleeve means in permitting flow through the valve.

14. A valve as in claim 13 wherein
each of said cage means has a relatively smooth periphery for allowing ready insertion thereof into said flexible sleeve means, and
the inner surface of said rigid sleeve means includes rims near the outer edges thereof, and said flexible sleeve means includes grooves on the outer periphery near the ends thereof for engaging and mating with the respective rims of said rigid sleeve means.

15. A valve for regulating the flow of fluid therethrough comprising,
a flexible sleeve means,
a pair of hollow cage means extending into the sleeve means from opposite ends thereof interconnected to each other for entrapping the sleeve means therebetween,
each of the cage means having a plurality of transverse flow passages therethrough,
the cage means having a central barrier to prevent direct axial flow therethrough,
the flexible sleeve means being preloaded in contact with the cage means and in sealing engagement about the transverse flow passages of the cage means, and
means forming a control chamber about the periphery of the flexible sleeve means to control the movement of the flexible sleeve means in permitting flow through the valve, said means forming said control chamber comprising rigid sleeve means disposed about said flexible sleeve means, and the inner surface of said rigid sleeve means including rims near the outer edges thereof, and said flexible sleeve means including grooves on the outer periphery near the ends thereof for engaging and mating with the respective rims of said rigid sleeve means.

16. A valve for regulating the flow of fluid therethrough comprising,
a flexible sleeve means,
a pair of hollow cage means extending into the sleeve means from opposite ends thereof interconnected to each other for entrapping the sleeve means therebetween,
the cage means having a central barrier to prevent direct axial flow therethrough,
each of said cage means having a plurality of narrow ribs defining a plurality of transverse flow passages therethrough, said transverse flow passages being elongated and having converging ends near said central barrier,
the flexible sleeve means being preloaded in contact with the cage means and in sealing engagement about the transverse flow passages of the cage means, and
means forming a control chamber about the periphery of the flexible sleeve means to control the movement of the flexible sleeve means in permitting flow through the valve.

17. A valve for regulating the flow of fluid therethrough comprising,
a flexible sleeve means,
a pair of hollow cage means extending into the sleeve means from opposite ends thereof interconnected to each other for entrapping the sleeve means therebetween,
each of said cage means having a relatively smooth periphery and terminating in a flange exteriorly of said flexible sleeve means,
each of the cage means having a plurality of transverse flow passages therethrough,
the cage means having a central barrier to prevent direct axial flow therethrough,
the flexible sleeve means being preloaded in contact with the cage means and in sealing engagement about the transverse flow passages of the cage means,
means forming a control chamber about the periphery of the flexible sleeve means to control the movement of the flexible sleeve means in permitting flow through the valve, said means forming said control chamber comprising rigid sleeve means disposed about said flexible sleeve means, and
the inner surface at the outer ends of said rigid sleeve means and the peripheral surface at the outer ends of said flexible sleeve means having cooperatively mating portions with the outer ends of said sleeve means being sandwiched between the ends of the outer periphery of said cage means and the outer internal ends of said rigid sleeve means, and with the flanges of said cage means abutting the outer edges of said rigid sleeve means.

18. A valve for regulating the flow of fluid therethrough comprising, a flexible sleeve means, a pair of hollow cage means extending into the sleeve means from opposite ends thereof interconnected to each other for entrapping the sleeve means therebetween, each of the cage means having a plurality of transverse flow passages therethrough, the cage means having a central barrier to prevent direct axial flow therethrough, said central barrier extending outwardly in a downstream flow direction of said valve, the flexible sleeve means being preloaded in contact with the cage means and in sealing engagement about the transverse flow passages of the cage means, and means forming a control chamber about the periphery of the flexible sleeve means to control the movement of the flexible sleeve means in permitting flow through the valve.

19. A valve for regulating the flow of fluid therethrough comprising, a flexible sleeve means, a pair of hollow cage means extending into the sleeve means from opposite ends thereof interconnected to each other for entrapping the sleeve means therebetween, each of the cage means having a plurality of transverse flow passages therethrough, the cage means having a central barrier to prevent direct axial flow therethrough, the flexible sleeve means being preloaded in contact with the cage means and in sealing engagement about the transverse flow passages of the cage means, means forming a control chamber about the periphery of the flexible sleeve means to control the movement of the flexible sleeve means in permitting flow through the valve, said means forming said control chamber comprising rigid sleeve means disposed about said flexible sleeve means, said rigid sleeve means having an opening therethrough, one of said cage means is a downstream cage means and has an orifice therethrough communicating with the outlet of the valve, and manifold means coupled with said rigid sleeve means and having a plurality of ports, a first of said ports providing external communication with said opening through said rigid sleeve means and another of said ports communicating with the outlet of said valve through said orifice in said downstream cage means.

20. A valve for regulating the flow of fluid therethrough comprising, a flexible sleeve means, a pair of hollow cage means extending into the sleeve means from opposite ends thereof interconnected to each other for entrapping the sleeve means therebetween, each of the cage means having a plurality of transverse flow passages therethrough, the cage means having a central barrier to prevent direct axial flow therethrough, said cage means being interconnected to each other by bolt means, said bolt means forming a conical fairing at said central barrier of said cage means in the downstream flow direction of said valve, the flexible sleeve means being preloaded in contact with the cage means and in sealing engagement about the transverse flow passages of the cage means, and means forming a control chamber about the periphery of the flexible sleeve means to control the movement of the flexible sleeve means in permitting flow through the valve.

* * * * *